United States Patent Office 3,488,326
Patented Jan. 6, 1970

3,488,326
TWO STAGE ANIONIC POLYMERIZATION OF LACTAMS
Johannes Van Beveren, Sittard, and Johannes Van Mourik, Geleen, Netherlands, assignors to Stamicarbon N.V.
No Drawing. Filed Nov. 1, 1966, Ser. No. 591,121
Claims priority, application Netherlands, Nov. 3, 1965, 6514207
Int. Cl. C08g 20/12, 20/18
U.S. Cl. 260—78         7 Claims

ABSTRACT OF THE DISCLOSURE

A process is described for the ionogenic catalytic polymerization of lactams, especially to form shaped objects thereof, wherein the reaction is carried out in a first stage using the monomer and a catalyst, but in the absence of a promotor, and then continued in a second stage at a lower temperature in the presence of an added promotor, so that the polymerization reaction is completed at the lower temperature.

---

The present invention relates to the preparation of high-molecular polymerization products obtained by ionogenic, catalytic polymerization of lactams.

In the ionogenic polymerization of lactams, as a rule, a lactam-metal compound is used as the catalyst. Catalysts well known to be suitable for use in this polymerization process are, e.g., lactam-metal salt-like compounds wherein the metal atom has replaced the hydrogen atom on the lactam nitrogen atom, such as sodium caprolactam and potassium caprolactam. The reaction may also be conducted by using a compound which, by reacting with the lactam, yields such lactam-metal salt-like compounds in situ, such as metal organic compounds, e.g., diisobutyl aluminum hydride, triethylaluminum, triisopropyl aluminum, diethyl zinc and alkali-metal alkyls, and also Girgnard compounds, such as alkylmagnesium bromide and arylmagnesium bromide, or inorganic alkaline compounds, such as hydrides, oxides, hydroxides, alcoholates and carbonates of alkali metals and alkaline earth metals, or such alkali or alkaline earth metals as such.

It is already known from, for instance, British patent specifications Nos. 842,576 and 872,328, that by using a promotor, the same polymerization reaction can be considerably accelerated, so that is is essentially complete in less than half an hour. Well-known promotors are those disclosed in the aforesaid specifications, including for instance, nitrogen compounds, such as isocyantes, carbodiimides, cyanamides and in general, compounds containing a tertiary nitrogen atom which is bound to a carbonyl, thiocarbonyl, sulfonyl or nitroso group, or also diimide ethers, such as dicaprolactim ether.

The amount of catalyst employed is usually about 0.1–2 mole percent with respect to the amount of lactam to be polymerized. However, it is also possible to use larger amounts, e.g., 5–10 mole percent. The amount of promotor used is also small, and is usually only about 0.05–2 mole percent with respect to the lactam.

When a promotor is used, the temperature at which the polymerization is carried out may be lower than in cases where a catalyst only is employed. As a rule, an initial temperature of about 140–170° C. is used in the polymerization of ε-caprolactam, in which case the temperature may increase to a certain extend during the polymerization, e.g., to about 190–215° C., due to the exothermic character of the said reaction. If the polymerization is conducted in this way, so that the temperature is always below the melting temperature of the polyamide to be obtained, then solid, high-molecular end products can be obtained which have the shape of the reaction chamber in which the polymerization was carried out, directly from the lactam monomer.

However, this attractive method of manufacturing shaped objects is difficult to realize if the dimensions of the object to be molded necessitates the use of a mold requiring removable parts to allow removal of the molded object. At the polymerization temperature, the mixture of the lactam to be polymerized, the catalyst and the promotor is a liquid of such low viscosity that it readily flows out of the mold, through the seams thereof. As a result, considerable losses will occur due to liquid-flow losses, and the final product will also be defective and incorrectly shaped owing to the polymerization mold not being filled to its full capacity.

In a process known from U.S. Patent No. 3,121,768, the polymerization reaction using the aforesaid mixture of lactam, catalyst and promotor is first allowed to proceed outside the polymerization mold for a short time until a more viscous reaction liquid has been obtained, which is then poured into the said mold. However, due to the rapid action of the promotors, this method is difficult to practice because the polymerization reaction outside the polymerization mold is liable to proceed too far and the viscosity of the reaction medium rapidly becomes too high, so that the polymerization mold then cannot be filled properly. If, on the other hand, the reaction liquid is poured into the mold too soon, the viscosity will then still be too low, so that the desired effect will not be achieved.

It has now been found that these difficulties may be avoided if the polymerization is carried out in accordance with the present invention.

A process for the preparation of high-molecular polymerization products by ionogenic, catalytic polymerization of lactams has now been found, in which process the polymerization reaction is accelerated owing to the presence of a promotor, but which is characterized in that the lactam is, with the aid of a catalyst, first polymerized to a liquid pre-polymerizate in the absence of a promotor, which pre-polymerizate is, after being mixed with a promotor, further polymerized.

In carrying out the process according to the invention, the lactam is first ionogenically polymerized with the aid of a catalyst only, in the absence of a promotor. To conduct this pre-polymerization reaction, it is preferred to use a temperature which is somewhat higher than that used in effecting the polymerization in the presence of a promotor. For instance, in the process for polymerizing ε-caprolactam, a temperature of about 175–210° C. is preferably first used for the polymerization stage, in the absence of a promotor, but with the aid of a catalyst, until a liquid pre-polymerizate is obtained. This liquid is then cooled to a temperature of about 140–170° C. and, subsequently, after being mixed with a promotor, is poured into a polymerization mold also heated at 140–170° C., and in which the lactam pre-polymerizate is then further polymerized to a solid polymerization product.

The liquid pre-polymerizate obtained in the above-described way in the absence of a promotor can be kept at a temperature of 140–170° C. for some time, mostly 0.5–1 hour, without a marked increase of the viscosity. After being mixed with the promotor at this temperature, the mixture remains pourable for only a few minutes, about 4–5 minutes, which time is amply sufficient for pouring the mixture into a polymerization mold, which preferably is heated at the above-mentioned temperature, and filling this mold to its full capacity.

If use need be made of polymerization molds composed of several parts, the pre-polymerizate mixture will be properly retained in the mold, so that losses owing to egression of the mixture between the mold seams will hardly occur.

Upon opening of the mold or, in the case of a composite mold, upon removal of the mold parts, the object of the desired dimensions is also obtained.

The dimensions of the objects obtained are somewhat smaller than those of the polymerization mold owing to the so-called shrinkage of the polymerizing mixture during the polymerization. Although the objects can be easily removed from the mold owing to this shrinkage, there will be the disadvantage that, if a series of objects is produced in the same polymerization mold, the dimensions of these objects will not be constant. In the process according to the invention a considerable part, usually more than half of the decrease in volume caused by the polymerization reaction is realized during the preparation of the liquid prepolymerizate. Accordingly, the process of this invention offers the important further advantage that during the final second-stage polymerization, the shrinkage will be small, so that at most considerably less polymer need be kept available for addition to the polymerization mold to compensate for the decrease in volume during the polymerization. As a result, less material is lost, while the advantage of the easy removability of the objects from the polymerization mold is retained, with greater precision and reproducibility in the dimensions of the molded objects occurring.

A further advantage is afforded by the process of this invention in the manufacture of polymerization products in which solid substances such as fillers and dyes have been incorporated. By distributing these solid substances through the liquid pre-polymerizate prepared in accordance with the invention, suspensions are obtained which are sufficiently stable so that the thus incorporated solid particles do not settle in the mold. As a result, polymerization products of greater homogeneity are obtained.

The liquid pre-polymerizate prepared in accordance with this invention is considerably less aggressive as to sticking to the mold than a mixture of monomeric lactam and catalyst. As a result, the second stage polymerization step can be carried out in polymerization molds made of synthetic resins, e.g., epoxy resins. Polymerization molds of this type are less costly and more readily made by using a phototype of the objects to be molded, which need be made only once, as the core and providing the component parts of the wall of the synthetic resin mold around this core in accordance with known procedures, for instance by casting and curing.

In general, in practicing this invention, it is desirable to conduct the first stage polymerization to the point that the pre-polymerizate has an intrinsic viscosity of between about 5 to 500 centistokes at about 150° C. In the second stage, the polymerization reaction proceeds to the point of formation of the solid product.

The invention will be further understood by reference to the following illustrative examples.

Example 1

With simultaneous stirring, 0.15 g. of potassium hydroxide is, at 80° C., added to 20 g. of molten ε-caprolactam, while passing a stream of dry nitrogen through the mixture (at the rate of 8 l. per hour), this being continued for 2 hours.

The mixture is then heated to 180° C. and kept at that temperature, after which the increase of the viscosity is measured upon cooling of the mixture to 150° C.

Upon heating for 15 minutes at 180° C. and cooling to 150° C., the viscosity (150° C.) increases from the initial value of 1.7 centistokes to 7.5 centistokes.

Upon heating for 20 minutes at 180° C. and cooling to 150° C., a mixture prepared in the same way has a viscosity of 20 centistokes.

Upon heating for 25 minutes at 180° C. and cooling to 150° C., another mixture prepared in the same way has a viscosity (150° C.) of 3000 centistokes.

At 150° C., 0.22 ml. of dicaprolactim ether as the promotor is added, with simultaneous stirring, to the aforesaid mixture, with a viscosity of 7.5 centistokes. After that, the mixture is poured into a cylindrical polymerization mold (glass, diameter 13 mm.) which has been heated at 150° C. After the polymerization has been continued for 11 minutes upon addition of the promotor, a bar of the internal shape of the mold, and which can be easily taken out of it, is obtained as the polymerization product.

Example 2

In a nitrogen atmosphere 0.15 g. of potassium hydroxide is, at 80° C. added to 22 g. of molten caprolactam with simultaneous stirring, after which the resulting mixture is distilled at 80–100° C. at reduced pressure until 2 g. of caprolactam has been discharged together with the water formed.

The resulting mixture of potassium caprolactam and caprolactam is heated to 190° C. and kept at that temperature, after which it is cooled to 150° C. and the increase of the viscosity is measured.

Upon heating for 10 minutes at 190° C. and cooling to 150° C., the viscosity amounts to 15 centistokes.

Upon heating for 12½ minutes at 190° C. and cooling to 150° C., a mixture prepared in the same way has a viscosity (150° C.) of 40 centistokes.

Upon heating for 15 minutes at 190° C. and cooling to 150° C., another mixture prepared in the same way has a viscosity (150° C.) of over 5000 centistokes and is only slightly pourable.

A mixture prepared in the same way from 66 g. of caprolactam and 0.45 g. of potassium hydroxide upon removal of 6 g. of caprolactam by vacuum distillation is heated for 13 minutes at a temperature of 190° C. and then cooled to 150° C. Subsequently, 0.66 ml. of dicaprolactam ether is, at 150° C., added as the promoter with simultaneous stirring, after which the mixture is poured into a polymerization mold heated at 150° C.

The said polymerization mold (brass) consists of two parts which are fitted against each other and enclose a flat, cylindrical chamber (internal diameter 120 mm., height 4 mm.) provided with a funnel-shaped filling opening.

The mixture does not flow out of the mold between the component parts. After the polymerization has been continued for 10 minutes upon addition of the promotor, a flat disc which can be easily taken out of the mold is obtained as the polymerization product.

It will be understood that this invention may be practiced in ways other than those specifically shown in the foregoing examples, and is limited only by the spirit and scope of the following claims.

What is claimed is:

1. In a process for the preparation of solid polymerization products by the polymerization of lactams wherein at least one lactam is subjected to polymerization with the aid of a catalyst, and a promoter, by heating the same at a polymerization temperature, the improvements consisting essentially in first heating a mixture of monomer and catalyst, in the absence of a promoter, in an initial stage to an initiating temperature in the range of between about 175–210° C. and sufficient to initiate polymerization of said lactam and until a liquid, pourable pre-polymerizate of said lactam is formed having an intrinsic viscosity of at least between about 5–500 centistokes at about 150° C., and subsequently lowering the temperature of said liquid pre-polymerizate product thereby obtained to a level below the temperature employed in said initial stage and in the range of about 140–170° C. and sufficient to initiate promoted polymerization, and thereafter adding the promoter so that the said polymerization is completed in the said second stage at the said lower temperature to form a solid polymer product.

2. The process according to claim 1, wherein said lactam is ε-caprolactam.

3. The process of claim 2 herein, after being mixed with said promotor, the pre-polymerisate is introduced into a mold at a temperature between about 140 to 170° C. and said second stage polymerisation reaction is carried out in the mold.

4. The process of claim 1 wherein said catalyst is a metal salt of said lactam.

5. The process of claim 4 herein said metal salt of said lactam is formed in situ in the reaction mixture by reaction of the lactam with an active metal.

6. The process of claim 1 wherein said catalyst is potassium hydroxide.

7. The process of claim 1 wherein said promotor is dicaprolactim ether.

References Cited

UNITED STATES PATENTS

| | | | |
|---|---|---|---|
| 3,017,391 | 1/1962 | Mottus et al. | 260—78 |
| 3,037,003 | 5/1962 | Griehl | 260—78 |
| 3,121,768 | 2/1964 | Boyer | 260—78 |
| 3,200,095 | 8/1965 | Wichterle et al. | 260—78 |
| 3,216,976 | 11/1965 | Schwartz et al. | 260—78 |
| 3,236,817 | 2/1966 | Zimmerman | 260—78 |
| 3,309,343 | 3/1967 | Darnell et al. | 260—78 |
| 3,342,784 | 9/1967 | Gehm et al. | 260—78 |

HAROLD D. ANDERSON, Primary Examiner

U.S. Cl. X.R.

260—78